US008880309B1

(12) United States Patent
Ly

(10) Patent No.: US 8,880,309 B1
(45) Date of Patent: Nov. 4, 2014

(54) SYSTEM AND METHOD FOR CONTROLLING A TRANSMISSION

(71) Applicant: Toyota Motor Engineering & Manufacturing North America, Inc., Erlanger, KY (US)

(72) Inventor: Tai J. Ly, Los Angeles, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 30 days.

(21) Appl. No.: 13/861,658

(22) Filed: Apr. 12, 2013

(51) Int. Cl.
*G06F 7/00* (2006.01)
*F16H 61/02* (2006.01)
*B60W 30/18* (2012.01)
*F16H 61/04* (2006.01)

(52) U.S. Cl.
CPC ..... *F16H 61/0204* (2013.01); *B60W 30/18054* (2013.01); *B60W 2510/1005* (2013.01); *B60W 30/18027* (2013.01); *F16H 61/0437* (2013.01); *Y10S 903/945* (2013.01)
USPC ................... 701/58; 701/36; 701/51; 701/61; 701/55; 701/412; 701/93; 903/945; 475/214; 475/269

(58) Field of Classification Search
CPC . F16H 3/663; F16H 61/0437; F16H 59/0204; F16H 59/08; B60W 2510/1005; B60W 30/18018; B60W 30/18027; B60W 30/18054; F16D 2500/30806
USPC ..................... 701/36, 51, 55, 58, 61, 93, 412; 903/945; 475/214, 254, 269, 275
See application file for complete search history.

(56) References Cited

U.S. PATENT DOCUMENTS

| 6,286,381 | B1 * | 9/2001 | Reed et al. .................. 74/336 R |
| 8,099,226 | B2 | 1/2012 | Ahn |
| 2002/0055410 | A1 * | 5/2002 | Nagasaka ....................... 477/94 |
| 2007/0287572 | A1 * | 12/2007 | Tabata et al. .................. 475/254 |

FOREIGN PATENT DOCUMENTS

DE          19738747 A1      3/1998

* cited by examiner

*Primary Examiner* — Gertrude Arthur Jeanglaude
(74) *Attorney, Agent, or Firm* — Gifford, Krass, Sprinkle, Anderson & Citkowski, P.C.

(57) ABSTRACT

The present invention provides a smoother driving experience through the use of an advanced powertrain system for a vehicle. The powertrain system includes a transmission having a gear selection controller adapted to select one of a plurality of gear ratios, an electronic control unit, at least one information acquisition unit wherein the electronic control unit uses information from the information acquisition unit to determine if the vehicle is stationary and if the vehicle is on an expressway. If the electronic control unit determines the vehicle is stationary and the vehicle is on an expressway, then the electronic control unit sends a signal to the gear selection controller of the transmission to select a lower gear ratio that would normally be used to transition the vehicle from a stationary to a moving state.

11 Claims, 2 Drawing Sheets

US 8,880,309 B1

SYSTEM AND METHOD FOR CONTROLLING A TRANSMISSION

FIELD OF THE INVENTION

The present invention relates to a system and method for controlling a transmission in a vehicle. Specifically, the present invention relates to gear ratio selection for the transmission based on properties of specific factors determined by the system.

BACKGROUND OF THE INVENTION

Vehicles having an engine and a transmission with a plurality of gear ratios have been known in the art for quite some time. The transmission of the vehicle allows the engine to run at an appropriate RPM and provide various torques and speeds down to the powertrain to the wheels of the vehicle to provide forward motion of the vehicle.

Also known is controlling the transmission having a plurality of gear ratios using various input criteria such as engine speed and requested acceleration from the driver, for example, through a driver input on an accelerator pedal.

These transmissions to date have suffered from a common problem in that when operating the vehicle in a congested freeway or highway traffic situation, for example in a traffic jam on an expressway, a jerky start motion can be experienced by the operator of the vehicle. As such, the present invention seeks to remedy this problem by providing a transmission system and method capable of giving a smoother driving experience for a vehicle in a congested traffic situation.

SUMMARY OF THE INVENTION

The present invention provides a smoother driving experience through the use of an advanced powertrain system for a vehicle. The powertrain system includes a transmission having a gear selection controller adapted to select one of a plurality of gear ratios, an electronic control unit, at least one information acquisition unit wherein the electronic control unit uses information from the information acquisition unit to determine if the vehicle is stationary and if the vehicle is on an expressway. If the electronic control unit determines the vehicle is stationary and the vehicle is on an expressway, then the electronic control unit sends a signal to the gear selection controller of the transmission to select a lower gear ratio that would normally be used to transition the vehicle from stationary to a moving state. In most transmissions, a lower gear ratio is equated with a higher gear number.

The at least one information acquisition unit can include a GPS unit operable to determine the location and velocity of the vehicle, the GPS unit having map location information to determine if the vehicle is on an expressway. The at least one information acquisition unit can further include a vehicle speed sensor for determining the speed of the vehicle, and can also further include a forward looking distance sensor which provides information relating to the distance between the vehicle and any objects in front of the vehicle.

The system operates by the electronic control unit acquiring the vehicle's speed and determining if the vehicle is on an expressway. If the vehicle is stationary, i.e., if the vehicle's speed equals zero, and the vehicle is determined to be on an expressway, then the electronic control unit sends a signal to a gear selection controller of the transmission instructing the transmission to start in a lower gear ratio than would normally be used to start motion from a stop. For example, the electronic control unit would instruct the gear selection controller to start the vehicle in a second gear of the transmission instead of a first gear of the transmission when starting from a stationary position. This lower gear ratio reduces the available torque delivered to the wheels of the vehicle, thereby reducing the amount of jerk felt by the driver of the vehicle when vehicle motion is initiated.

DETAILED DESCRIPTION OF THE PREFERRED EMBODIMENTS

Figure 1:
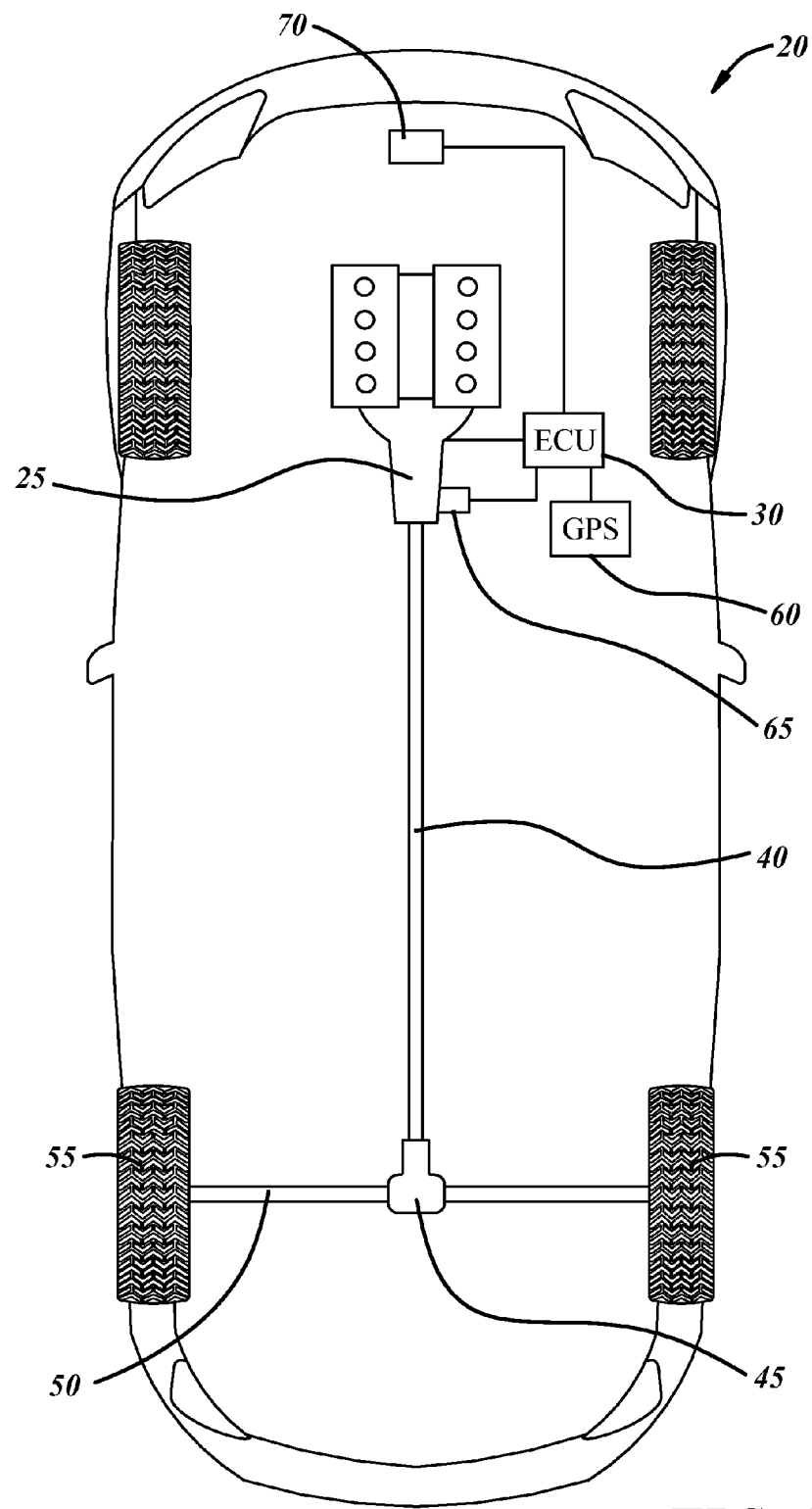
FIG. 1 is a diagrammatic view illustrating a preferred embodiment of the present invention.

The present invention includes a powertrain system for a vehicle 20. The powertrain system comprising a transmission 25 having a gear selection controller (not shown) adaptive to select one of a plurality of gear ratios capable of being produced by the transmission 25. The powertrain system further includes an electronic control unit 30 and at least one information acquisition unit. The electronic control unit 30 uses information from the information acquisition unit(s) to determine if the vehicle 20 is stationary and if the vehicle 20 is on an expressway or in a congested traffic situation. If the electronic control unit determines the vehicle is stationary and the vehicle is in a congested traffic situation or on an expressway then the electronic control unit 30 sends a signal to the gear selection controller of the transmission 25 to select a lower gear ratio that would normally be used to transition the vehicle from a stationary to a moving state.

Within the vehicle 20, the powertrain system of the present invention can be used in conjunction with other standard powertrain elements such as an engine 35 or other rotary power source which sends power to the transmission 25. The transmission 25 can then output rotational power to a drive shaft 40 to be sent to a differential 45 out a rear axle 50 to wheels 55 to drive the vehicle 20 forward. In the preferred embodiment, as well as the foregoing and following discussion, a rear wheel drive powertrain system is used. However, it is appreciated that the present invention could also be adapted for use in other vehicle powertrain systems, such as front wheel drive or all wheel drive powertrain system.

The transmission 25 for use in the present invention can be any one of a number of designs currently known or yet to be developed, so long as the transmission 25 can produce a plurality of gear ratios thereby varying the rotational speed and torque between an input and an output of the transmission 25. Types of transmissions known to those skilled in the art include, but are not limited to, transmissions utilizing planetary gear sets to produce a plurality of gear ratios, sequentially geared transmissions having multiple clutches capable of producing a plurality of gear ratios and continuously variable transmissions (CVT) capable of producing a plurality of gear ratios.

The transmission 25 of the present invention includes the gear selection controller which is adaptive to select one of the pluralities of gear ratios produced by the transmission 25, as discussed above. The preferred embodiment of the transmission of the present invention is a planetary gear set type transmission.

The present invention utilizes the electronic control unit 30 to send a signal to the gear selection controller of the transmission 25. The electronic control unit 30 sends the signal when it determines that the vehicle 20 is stationary and the vehicle 20 is either on an expressway or in a congested traffic situation. To make this determination, the electronic control unit 30 acquires information from one or more information acquisition units.

One type of information acquisition unit of the present invention is a GPS unit 60 having map information such as roads, streets, expressways, etc. The GPS unit 60 is further capable of providing location information of the vehicle 20. Combining the location information and the map information, the GPS unit 60 can provide to the electronic control unit 30 vehicle map location information so that the electronic control unit 30 can identify if the vehicle 20 is on an expressway. The term expressway is used herein to mean any type of expressway, freeway, road, etc., that does not have stop lights or stop signs, and is traditionally entered or exited via an on ramp or an off ramp.

In addition to the vehicle map location information, the GPS unit 60 can determine the speed of the vehicle 20 and send that information to the electronic control unit 30.

Another type of information acquisition unit for use with the current invention is a speed sensor 65. In the preferred embodiment, the speed sensor 65 is mounted to the output shaft of the transmission 25, the speed sensor 65 measuring the rotational speed of the output shaft of the transmission 25 to determine the overall speed of the vehicle 20. This vehicle speed is sent to the electronic control unit 30. While the preferred embodiment uses a speed sensor 65 attached to the output shaft of the transmission 25, it is appreciated that the speed sensor 65 could be attached in numerous other locations on the vehicle 20, such as on the drive shaft 40, the rear axle 50, the wheels 55 or in any other location known to those skilled in the art. It is further appreciated that the speed sensor 65 can send rotational speed information about whatever component it is measuring to the electronic control unit 30, with the electronic control unit 30 calculating the speed of the vehicle 20.

A third type of information acquisition unit utilized by the present invention is a forward looking proximity sensor 70. The forward looking proximity sensor 70 is mounted on the front of the vehicle 20 and determines the distance between the vehicle 20 and an object in front of the vehicle 20. Such forward looking proximity sensors 70 can include devices such as radar range sensors, laser range sensors and other range detection devices known to those skilled in the art. The forward looking proximity sensor 70 sends distance information relating to the distance between the vehicle 20 and an object in front of the vehicle 20 to the electronic control unit 30.

Figure 2:
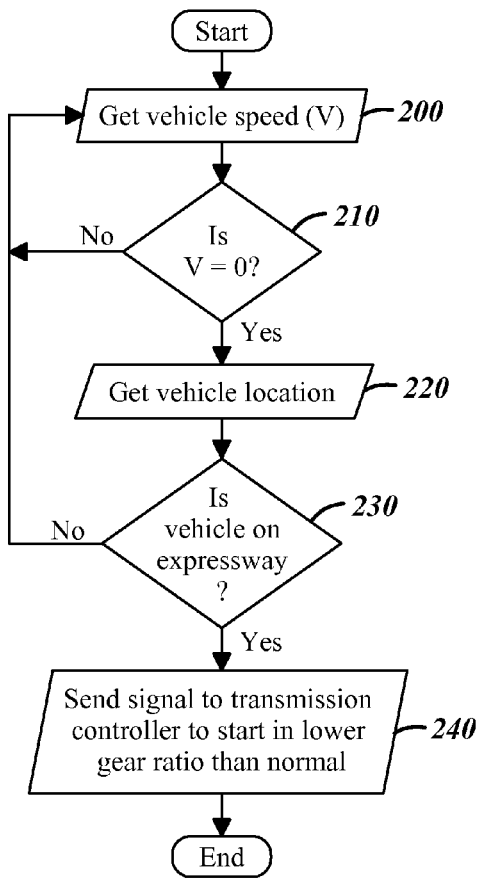
FIG. 2 is a flowchart illustrating the general operation of one embodiment of the present invention.

One embodiment of the method utilized by the electronic control unit 30 is shown in FIG. 2. In this embodiment, the electronic control unit 30 obtains the vehicle speed 200 from at least one information acquisition unit, for example, from the GPS unit 60 or the speed sensor 65. The electronic control unit then looks to see if the vehicle speed is equal to zero 210. If the vehicle speed is not equal to zero, the electronic control unit does not override the normal shifting routine of the transmission, and the electronic control unit 30 restarts its inquiry. If the vehicle speed is read by electronic control unit 30 as being zero, then the electronic control unit 30 acquires the vehicle map location information 220, for example from the GPS unit 60. Using this information, the electronic control unit 30 determines if the vehicle is on an expressway 230. If the vehicle is not on an expressway, the electronic control unit 30 does not override the normal shifting routine of the transmission, and reiterates the process from the beginning.

However, if the vehicle is determined to be on an expressway, then the electronic unit 30 overrides the normal shifting routine and sends a signal to the gear selection controller to start the transmission in a lower gear ratio than normal 240. For example, the electronic control unit 30 will send a signal to the gear selection controller to start the transmission 25 in second gear from a stopped position instead of the normally used first gear. In the case where a CVT transmission is used, the gear ratio of the transmission is altered to a lower gear ratio than normally used, this gear ratio being predetermined by the transmission, engine, and vehicle manufacturers. It is appreciated that the determination steps above could be conducted in a different order to achieve the same outcome.

Figure 3:
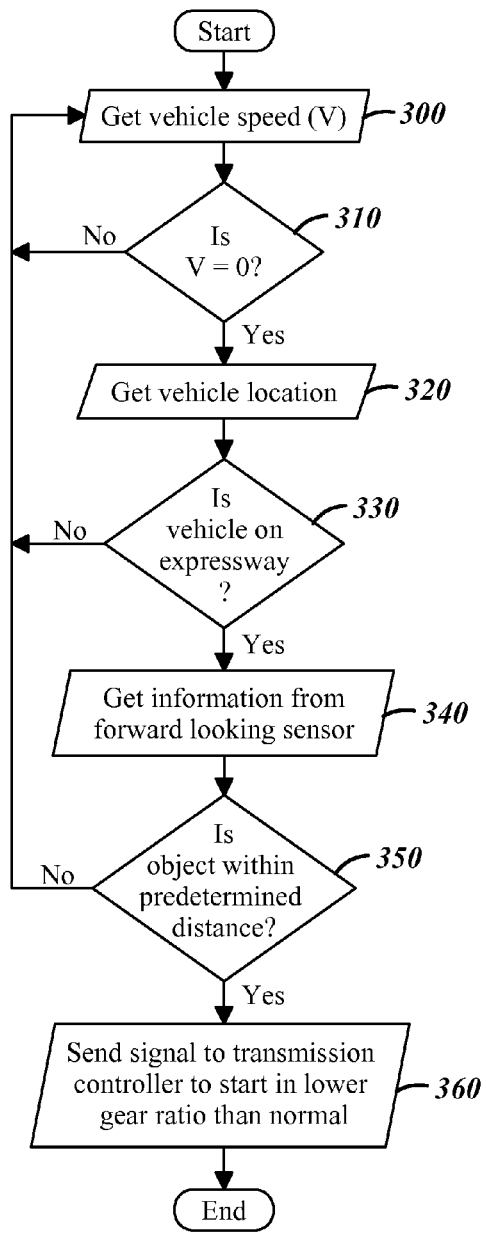
FIG. 3 is a flowchart illustrating the general operation of another embodiment of the present invention.

An alternative determination process is shown in FIG. 3. The determination process in FIG. 3 is similar to the determination process discussed above in FIG. 2 insomuch as the electronic control unit 30 acquires the vehicle speed 300 and determines if the speed is equal to zero 310. The electronic control unit 30 acquires the vehicle location 320 and determines whether or not the vehicle is on an expressway 330. However, before sending a signal to the gear selection controller, the electronic control unit 30 acquires distance information 340, for example from the forward looking proximity sensor 70, and determines if there is an object within a predetermined distance in front of the vehicle 20 350. If there is no object within a predetermined distance the electronic control unit restarts the process form the beginning. If an object is detected within a predetermined distance then the signal is sent to the gear selection controller to start the vehicle 20 in motion with the transmission 25 in a lower gear ratio than normal 360. It is appreciated that the determination steps above could be conducted in a different order to achieve the same outcome.

This second embodiment of the invention produces additional benefits but also poses additional costs. The additional cost is derived from the additional parts and programming logic required for the system. However, it provides a benefit in that the additional determination step of determining if there is an object within a predetermined distance in front of the vehicle 20 allows the vehicle 20 to provide a less jerky feeling to the driver in a congested traffic situation on an expressway, for example, in bumper to bumper traffic where another vehicle is in front of the vehicle 20 within the predetermined distance. At the same time the second embodiment provides maximum available acceleration, for example, if the driver had to pull off to the side of the road creating a stationary situation for the vehicle on an expressway while not in congested traffic, then the electronic control unit 30 would not signal to start in second gear because there would be not object in front of the vehicle 20 with the predetermined distance. In this situation, the driver pulling off to the side of the road on an expressway in normal traffic would be able to achieve full acceleration through the use of all available gears ratios of the transmission.

The powertrain system for a vehicle of the present invention is explained herein with reference to a first and second embodiment, however, those skilled in the art will appreciate that the present invention is not limited to these embodiments and can embrace other embodiments and modifications which are to be considered as within the scope of the present invention. Many modifications and variations of the present invention are possible in light of the above teachings. The present invention has been described in an illustrative manner. It is to be understood that the terminology which has been used is intended to be in the nature of words of description rather than limitation.

The invention claimed is:

1. A powertrain system for a vehicle comprising;
a transmission having a gear selection controller adaptive to select one of a plurality of gear ratios;
an electronic control unit;
at least one information acquisition unit;
wherein the electronic control unit uses information from the information acquisition unit to determine when the vehicle is stationary and when the vehicle is on an expressway, when the electronic control unit determines the vehicle is stationary and the vehicle is on an expressway then the electronic control unit sends a signal to the gear selection controller of the transmission to select a lower gear ratio than would normally be used to transition the vehicle from a stationary to a moving state.

2. The powertrain system of claim 1 wherein the at least one information acquisition unit is a GPS unit having road map data, the GPS unit providing vehicle speed information and vehicle map location information to the electronic control unit.

3. The powertrain system of claim 1, further comprising:
the at least one information acquisition unit including a GPS unit having road map data, and a vehicle speed sensor,
wherein the GPS unit provides vehicle map location information to the electronic control unit and the vehicle speed sensor provides vehicle speed data information to the electronic control unit.

4. The powertrain system of claim 3 further comprising,
the at least one information acquisition unit including a forward looking distance sensor,
the forward looking distance sensor provides distance information to the electronic control unit.

5. A powertrain system for a vehicle comprising:
a transmission having a gear selection controller adaptive to select one of a plurality of gear ratios;
an electronic control unit;
at least one information acquisition unit;
wherein the electronic control unit uses information from the information acquisition unit to determine when the vehicle is stationary and when the vehicle is in a congested traffic situation, when the electronic control unit determines the vehicle is stationary and the vehicle is in a congested traffic situation then the electronic control unit sends a signal to the gear selection controller of the transmission to select a lower gear ratio than would normally be used to transition the vehicle from a stationary to a moving state.

6. The powertrain system of claim 5 wherein the at least one information acquisition unit is a GPS unit having road map data, the GPS unit providing vehicle speed information and vehicle map location information to the electronic control unit.

7. The powertrain system of claim 5 further comprising,
the at least one information acquisition unit including a GPS unit having road map data, and a vehicle speed sensor,
wherein the GPS unit provides vehicle map location information to the electronic control unit and the vehicle speed sensor providing vehicle speed data information to the electronic control unit.

8. The powertrain system of claim 7 further comprising,
the at least one information acquisition unit including a forward looking distance sensor,
the forward looking distance sensor providing distance information to the electronic control unit.

9. The powertrain system of claim 5 further comprising:
the at least one information acquisition unit including a speed sensor and a forward looking distance sensor,
wherein the speed sensor provides vehicle speed information to the electronic control unit and the forward looking distance sensor provides information on the distance to an object in front of the vehicle electronic control unit.

10. A method for controlling a transmission having a plurality of gear ratios comprising:
providing a powertrain system including a transmission controller, an electronic control unit and at least one information acquisition unit;
acquiring a speed of a vehicle;
determining when the speed of the vehicle is equal to zero;
acquiring a location of the vehicle;
determining when the vehicle is on an expressway; and
sending a signal to the transmission controller to start the transmission in a lower gear ratio than normal when the vehicle speed is equal to zero and the vehicle is on an expressway.

11. The method for controlling a transmission having a plurality of gear ratios of claim 10 further comprising:
acquiring information about an object in front of the vehicle;
determining when the object is within predetermined distance; and
sending a signal to the transmission controller to start the transmission in a lower gear ratio than normal only if the vehicle speed is equal to zero, the vehicle is on an expressway and the object in front of the vehicle is within the predetermined distance.

* * * * *